US006909461B1

(12) United States Patent
Gallagher et al.

(10) Patent No.: US 6,909,461 B1
(45) Date of Patent: Jun. 21, 2005

(54) METHOD AND APPARATUS TO EXTEND THE EFFECTIVE DYNAMIC RANGE OF AN IMAGE SENSING DEVICE

(75) Inventors: Andrew C. Gallagher, Rochester, NY (US); David N. Nichols, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 734 days.

(21) Appl. No.: 09/615,398

(22) Filed: Jul. 13, 2000

(51) Int. Cl.[7] .......................... H04N 3/14; H04N 5/335; H04N 3/12; H04N 5/235
(52) U.S. Cl. ...................... 348/294; 348/332; 348/362; 250/214 R; 250/214.1; 257/436; 257/448
(58) Field of Search .............................. 348/297, 298, 348/332; 257/436, 448, 451; 250/214 R, 214.1

(56) References Cited

U.S. PATENT DOCUMENTS

| 3,971,065 A | | 7/1976 | Bayer |
| 4,667,092 A | | 5/1987 | Ishihara |
| 5,012,333 A | | 4/1991 | Lee et al. |
| 5,652,621 A | | 7/1997 | Adams, Jr. |
| 5,714,753 A | * | 2/1998 | Park ........................ 250/208.1 |
| 5,801,773 A | | 9/1998 | Ikeda |
| 5,838,373 A | * | 11/1998 | Hasegawa et al. .......... 348/312 |
| 6,040,858 A | | 3/2000 | Ikeda |
| 6,083,429 A | | 7/2000 | Wester |
| 6,122,109 A | | 9/2000 | Peake et al. |
| 6,137,634 A | | 10/2000 | Li |
| 6,163,407 A | | 12/2000 | Okazaki et al. |
| 6,201,617 B1 | * | 3/2001 | Kusaka ........................ 358/482 |
| 6,300,612 B1 | * | 10/2001 | Yu ........................... 250/208.1 |

FOREIGN PATENT DOCUMENTS

| EP | 0 713 342 A | 5/1996 |
| WO | WO 00/79784 A1 | 12/2000 |

OTHER PUBLICATIONS

"High Dynamic Range Imaging: Spatially Varying Pixel Exposures" by Shree K. Mayar and Tomoo Mitsunaga. Proceedings IEEE Conference on Computer Vision and Pattern Recognition, vol. 1, pp. 472–479.*
Patent Abstracts of Japan, vol. 2000, No. 14, Mar. 5, 2001 & JP 2000 316163A (Olympus Optical Co. Ltd), Nov. 14, 2000 *abstract*.
Patent Abstracts of Japan, vol. 2000, No. 7, Sep. 29, 2000 & JP 2000 125209 A (Fuji Photo Film Co. Ltd), Apr. 28, 2000 *abstract*.
"High Dynamic Range Imaging: Spatially Varying Pixel Exposures" by Shree K. Mayar and Tomoo Mitsunaga. IEEE Conference on Computer Vision and Pattern Recognition, vol. 1, pp. 472–479.

* cited by examiner

*Primary Examiner*—Thai Tran
*Assistant Examiner*—Brian C Genco
(74) *Attorney, Agent, or Firm*—David M. Woods

(57) ABSTRACT

An image capture system generates an extended effective dynamic range from a signal provided by an image sensor by utilizing an image sensing device having standard photosites with a predetermined response to a light exposure and non-standard photosites with a slower response to the same light exposure. An optical section exposes the image sensing device to image light, thereby causing the image sensing device to generate an image signal and a processing section expands the response of the standard photosites to increased light exposures by utilizing the image signals from neighboring non-standard photosites. Furthermore, the processing section may expand the response of the non-standard photosites to decreased light exposures by utilizing the image signals from neighboring standard photosites. The differential response of the image sensor is provided by a structural element, such as an array of lenslets, a mask or a neutral density filter, overlying the photosites and providing the standard photosites with a predetermined standard response to a light exposure and the non-standard photosites with a slower response to the same light exposure.

54 Claims, 5 Drawing Sheets

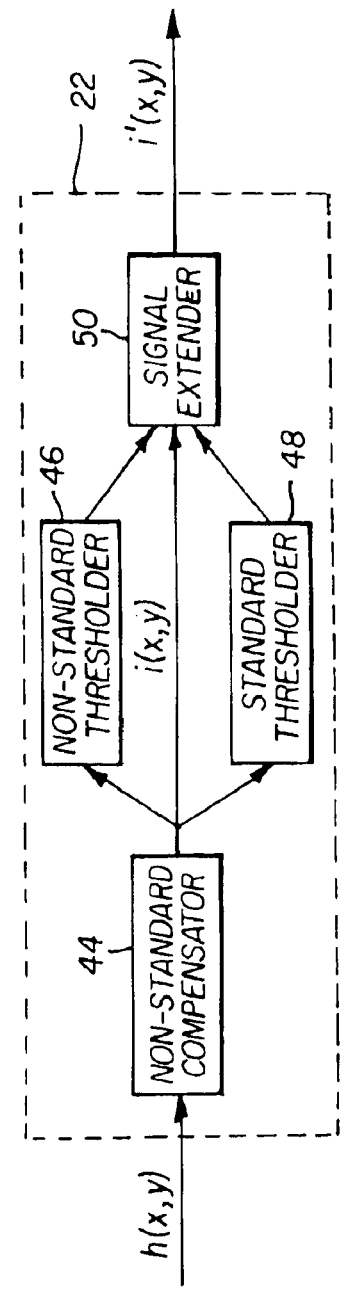

METHOD AND APPARATUS TO EXTEND THE EFFECTIVE DYNAMIC RANGE OF AN IMAGE SENSING DEVICE

FIELD OF THE INVENTION

The invention relates generally to the field of image capture, and more specifically to a method of extending the effective dynamic range of an image sensing device.

BACKGROUND OF THE INVENTION

Image sensing devices, such as a charge-coupled device (CCD), are commonly found in such products as digital cameras, scanners, and video cameras. These image sensing devices have a very limited dynamic range when compared to traditional negative film products. A typical image sensing device has a dynamic range of about 5 stops. This means that the exposure for a typical scene must be determined with a fair amount of accuracy in order to avoid clipping the signal. In addition, oftentimes the scene has a very wide dynamic range as a result of multiple illuminants (e.g. frontlit and backlit portions of a scene). In the case of a wide dynamic range scene, choosing an appropriate exposure for the subject often necessitates clipping data in another part of the image. Thus, the inferior dynamic range of an image sensing device relative to silver halide media results in lower image quality for images obtained by an image sensing device.

An increase in the dynamic range of an image sensing device would allow images from digital cameras to be rebalanced to achieve a more pleasing rendition of the image. Also, increasing the dynamic range of an image sensing device would allow for more pleasing contrast improvements to the image, such as is described by Lee et al. in commonly assigned U.S. Pat. No. 5,012,333.

U.S. Pat. No. 6,040,858 (Ikeda) provides a complete description of the problem of the limited dynamic range of image sensing devices. In addition, Ikeda describes methods of extending the dynamic range of an image sensing device by utilizing multiple image signals, each with different responses to exposure. These multiple signals are combined by using thresholds which determine which signal is of higher quality at each position in the image signal to form an image signal having extended dynamic range. Ikeda improves upon these methods by describing a method by which these thresholds are determined for each color.

However, these prior art methods, including Ikeda, require multiple image signals to form an image signal having extended dynamic range. Attaining such multiple signals can cause difficulty. For example, if the multiple image signals are not captured simultaneously, objects moving in the scene or motion of the camera may produce artifacts in an image signal having extended dynamic range. Additionally, if the image signals are captured simultaneously but on separate image capture devices, then a correspondence problem exists. Moreover, the additional hardware adds undesirable cost to the imaging system.

Thus there exists a need to improve upon the method of the prior art in order to improve the dynamic range of an image sensing device. Specifically, there exists a need to produce an extended dynamic range image signal with a single image sensing device and a single image signal.

SUMMARY OF THE INVENTION

The present invention is directed to overcoming one or more of the problems set forth above. Briefly summarized, according to one aspect of the present invention, an image capture system generates an extended effective dynamic range from a signal provided by an image sensor by utilizing an image sensing device having standard photosites with a predetermined response to a light exposure and non-standard photosites with a slower response to the same light exposure. An optical section exposes the image sensing device to image light, thereby causing the image sensing device to generate an image signal and a processing section expands the response of the standard photosites to increased light exposures by utilizing the image signals from neighboring non-standard photosites. Furthermore, the processing section may expand the response of the non-standard photosites to decreased light exposures by utilizing the image signals from neighboring standard photosites.

From another aspect, the invention includes an image sensor for generating an image signal useful in an extended dynamic range system, wherein the image sensor includes an array of photosites divided into standard photosites and non-standard photosites and a structural element overlying the photosites and providing the standard photosites with a predetermined standard response to a light exposure and the non-standard photosites with a slower response to the same light exposure. This structural element may take the form of (a) an array of lenslets overlying the photosites, wherein the lenslets overlying the standard photosites are structured to be more efficient in focusing light than the lenslets overlying the non-standard photosites, (b) a mask with apertures overlying the photosites, wherein the apertures overlying the standard photosites are larger than the apertures overlying the non-standard photosites, or (c) a neutral density filter overlying the photosites, wherein the portion of the neutral density filter overlying the standard photosites is more transparent than the portion of the neutral density filter overlying the non-standard photosites.

In the present invention, selected photosites of the image capture device are designed to have non-standard response to exposure. These non-standard photosites generally have a slower response to exposure than do the non-selected, or standard, photosites. The advantage of the invention is that the image signal from such a image capture device is processed to take advantage of the dynamic ranges of all photosites. Thus, an image signal having increased dynamic range is produced by interpolating the values of neighboring photosites for those photosites that are saturated or at a noise level.

BRIEF DESCRIPTION OF THE DRAWINGS

FIG. 3A illustrates the arrangement of non-standard photosites and standard photosites on a panchromatic image sensing device.

FIG. 3B illustrates the arrangement of non-standard photosites and standard photosites on a color image sensing device.

FIG. 4. Shows an exploded block diagram of the dynamic range extending filter array (DREFA) processor shown in FIG. 1.

DETAILED DESCRIPTION OF THE INVENTION

Because imaging devices employing electronic sensors are well known, the present description will be directed in particular to elements forming part of, or cooperating more directly with, apparatus in accordance with the present invention. Elements not specifically shown or described herein may be selected from those known in the art. Note that as used herein, the term image is a two dimensional array of values. An image may be a two dimensional subset of another image.

Figure 1:
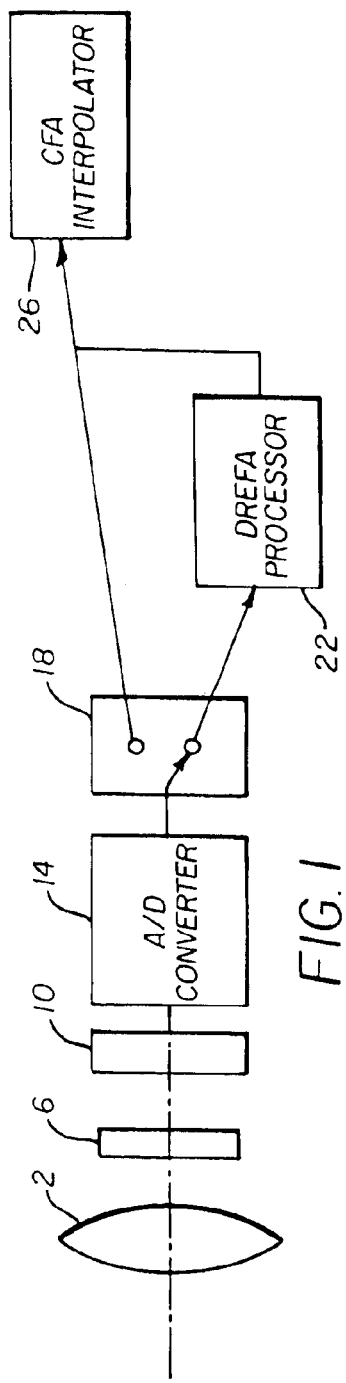
FIG. 1 is a block diagram of an extended-range image sensing device according to the invention.

Referring to FIG. 1, light from an object or scene is incident upon a lens 2. An optical low pass filter 6 performs a slight blurring of the image in order to reduce the occurrence of aliasing. The image falls on an image sensing device 10 such as a charged-coupled device (CCD). Note that other devices, such as CMOS devices, may be used as the image sensing device 10.

An A/D converter 14 converts the image signal from the image sensing device 10 into a digital signal. More specifically, the A/D converter 14 converts the linear voltage signal from the image sensing device 10 to a discrete digital signal, preferably a 10 bit signal. Thus, the linear encoded values range from 0 to 1023. The A/D converter 14 also preferably performs processing to convert the linear 10 bit signal to an 8 bit logarithmic signal, as is commonly performed in the art. The following equation is used to convert the 10 bit linear signal a(x,y), where (x,y) specifies the row and column index of the signal location with reference to the image sensing device 10, into the 8 bit logarithmic signal b(x,y):

$$b(x, y) = \begin{cases} 0 & 0 \le a(x, y) \le 31 \\ 73.5975 \ln a(x, y) - 255 & 32 \le a(x, y) \le 1024 \end{cases}$$

Note that each stop of exposure (in the linear response region of the image sensing device) results in a doubling of the linear signal a(x,y) and results in an increase of the logarithmically encoded signal b(x,y) by 51. In this case, the value 51 represents the number of code values per stop (cvs) of exposure.

The system controller 18 determines on the basis of user input or on the basis of the image signal output from the A/D converter 14 whether the dynamic range needs to be expanded (i.e. with the "expanding mode" of processing) or whether there is no need for expanding (i.e., the "normal mode" of processing). The system controller 18 then diverts the digital image signal b(x,y) to either the dynamic range extending filter array (DREFA) processor 22 if the system controller 18 is in an expanding mode, or to the color filter array (CFA) interpolator 26 if the system controller 18 is in a normal mode. Alternatively, the system controller 18 may be set at the time of manufacture to always be in the "expanding mode."

In the "normal mode", the system controller 18 diverts the image signal output from the A/D converter 14 to the CFA interpolator 26. The purpose of the CFA interpolator 26 is to generate a full description of the color for each location of the digital image. In the preferred embodiment, the image sensing device 10 consists of an array of photosensitive elements. Each photosite is typically coated with either a red, green, or blue filter, as described by Bayer in commonly assigned U.S. Pat. No. 3,971,065, which is incorporated herein by reference. The Bayer array is a color filter array in which green filters are located in a checkerboard pattern over the photosites with red and blue filter alternating line by line to fill the interstices of the checkerboard pattern; this produces twice as many green filter sites as either red or blue filter sites. Note that the method described herein may be easily extended to color filter arrays with different arrangements of the primaries, a different number of primaries, or a different set of primaries. Thus, in the preferred embodiment, each photosite is sensitive to either red, green, or blue light. However, it is desirable to obtain a value of exposure for each of the red, green, and blue exposures at each photosite location. In this description, "red", "green", and "blue" represent the primaries of an image sensing device 10, as is well known in the art of image processing. A CFA interpolator 26 generates from the image signal output from the A/D converter 14 an interpolated image signal consisting of a value for each of the primaries of a photosensitive element. For example, if a particular photosite is coated with a red filter, then the A/D converter 14 outputs a red level of exposure for that photosite since the red filter essentially blocks green and blue light from reaching the image sensing device 10.

The operation of the CFA interpolator 26 is to determine the levels of exposure for a red photosite for both the green and the blue primaries. Similarly, the CFA interpolator 26 determines the green and red exposure levels for the blue photosites, as well as the red and the blue exposure levels for the green photosites. Generally, the CFA interpolator 26 operates by considering the exposure values of the photosite and the values of surrounding photosites. While any commonly known interpolator may be used, a description of a preferred CFA interpolator is contained in commonly assigned U.S. Pat. No. 5,652,621, entitle "Adaptive color plane interpolation in single sensor color electronic camera", which is incorporated herein by reference. This patent describes apparatus for processing a digitized image signal obtained from an image sensor having color photosites aligned in rows and columns that generate at least three separate color values but only one color value for each photosite location, and a structure for interpolating color values for each photosite location so that it has three different color values. The apparatus generates an appropriate color value missing from a photosite location by the interpolation of an additional color value for such photosite locations from color values of different colors than the missing color value at nearby photosite locations. The apparatus also obtains Laplacian second-order values, gradient values and color difference bias values in at least two image directions from nearby photosites of the same column and row and selects a preferred orientation for the interpolation of the missing color value based upon a classifier developed from these values. Finally, the missing color value from nearby multiple color values is selected to agree with the preferred orientation.

In the "expanding mode" the system controller 18 diverts the image signal output from the A/D converter 14 to the DREFA processor 22 in order to expand the dynamic range of the image signal. In the preferred embodiment, the dynamic range of the image sensing device 10 is expanded by selecting certain photosites of the image sensing device 10 to have a non-standard response. The arrangement of the selected photosites with respect to the image sensing device 10 will be discussed in greater detail hereinbelow. In the preferred embodiment, the responses of selected photosites are slowed by altering the gain of the selected photosites, herein referred to as non-standard photosites. Altering the gain of a photosite is commonly practiced in the art of digital camera design and manufacture.

Figure 5:
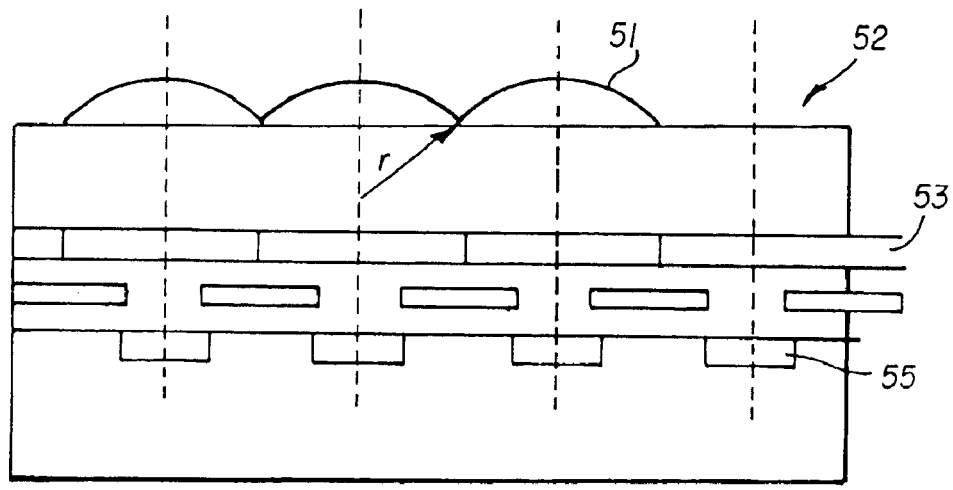
FIG. 5 is a cross-section of an interline image sensor employing an array of lenslets to alter the response of selected photosites.

With reference to FIG. 5, it is a common practice in the art of image sensor manufacture to place resin lenslets 51 on top of each photosite. For example, particularly when the image sensing device 10 is an interline solid state image sensing device, one lenslet technique is described in U.S. Pat. No. 4,667,092, entitled "Solid-state image device with resin lens and resin contact layer", which is incorporated herein by reference. In this patent, more specifically, a solid-state image device includes an image storage block having a block surface and a plurality of storage elements are embedded along the block surface to store an image in the form of electric charge. An overlying layer is deposited to form an array of optical lenses in correspondence to the storage elements. An intermediate layer is laid between the block surface and the overlying layer. Incident light focuses through the lenses and the intermediate layer onto the storage elements. The intermediate layer serves as an adjusting layer for adjusting a focal length.

FIG. 5 shows a cross section of an interline solid state image sensing device. Without the lenslets 51, the signal readout area associated with each photosensitive area 55 of a photosite makes it impossible to use the whole area of the semiconductor substrate as the photoelectric transducer area. The conventional solid-state image device does not effectively utilize all incident rays thereon and therefore has low sensitivity. The addition of a resin lenslet 51 on top of a photosite allows the incident rays of light to be focused on the photoactive areas of the photosite, thereby more effectively utilizing the incident rays of light and increasing the sensitivity of the photosite. Thus, by varying the size and/or efficiency of the lenslet 51, the sensitivity (gain) of the photosite may be easily altered. Thus, for interline devices and for CMOS sensors the preferred method of altering the gain of the photosite is by altering the lenslet 51 placed on top of the photosite. As shown in FIG. 5, the location 52 has no lenslet, and therefore fewer incident rays of light are incident with the photosensitive area. Alternatively, a lenslet could be manufactured at location 52 with a different radius, shape, size or material as compared with the lenslet 51, thereby structured to be less efficient at focusing incident rays of light onto the photosensitive area 55 than is the standard lenslet 51. Those skilled in the art will recognize that if the lenslet 51 focuses 80% of the incident rays of light onto a photosensitive area 55 and the region 52 having no lenslets (or alternatively non-standard lenslets) allows 20% of the incident rays of light onto a photosensitive area 55, then the photosite covered by lenslet 51 is 2 stops faster than the region 52. In this case, the lenslet 51 is used for standard photosites and no lenslet is used for non-standard photosites, as represented by region 52.

Figure 6:
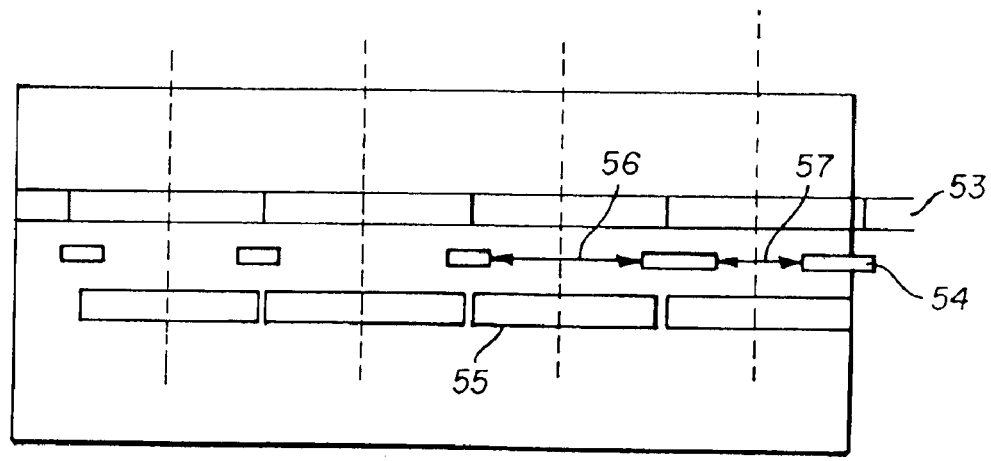
FIG. 6 is a cross-section of a full frame image sensor employing a metal mask to alter the response of selected photosites.

With reference to FIG. 6 showing a cross section of a full frame image sensing device 10, in the case where the image sensing device 10 is a full frame device, light rays incident to the photosensitive area 55 of a photosite must pass through an aperture of a mask, typically made from metal, which is shown in cross-section in FIG. 6 to comprise light-blocking metallic mask portions 54 and open apertures 56 and 57 interspersed among the metallic portions. In the preferred embodiment, the gain of photosites may be altered by modifying the metal mask 54 light shield. The sensitivity of the photosite is then directly related to the aperture of the metal mask 54 light shield. For example, one photosite with an aperture 50% of the size of a second photosites aperture will have a response of 50% compared to that on the second photosite. For example, a first aperture 56 of a light shield 54 allows 80% of the light rays incident upon that photosite to pass through, but a second aperture 57 is smaller and allows only 20% of the incident light rays to pass. Those skilled in the art will recognize that the photosite with the larger first aperture 56 is 2 stops faster than a photosite with the smaller second aperture 57. In this case, the first aperture 56 is used for standard photosites, and the second aperture 57 is used for the non-standard photosites. Thus, the aperture of a light mask may be modified to adjust the response of the selected photosites. Kodak makes full frame image sensing devices with a metal mask light shield that reduces the pixel active area of all pixels from about 80% to about 20% (for dithered scanner applications where the sensor is moved by ½ the pixel spacing horizontally and vertical and 4 pictures are taken). The invention thus involves utilizing such mask technology, but with different sized apertures, to provide an image sensor with a differential response to image light.

Figure 2:
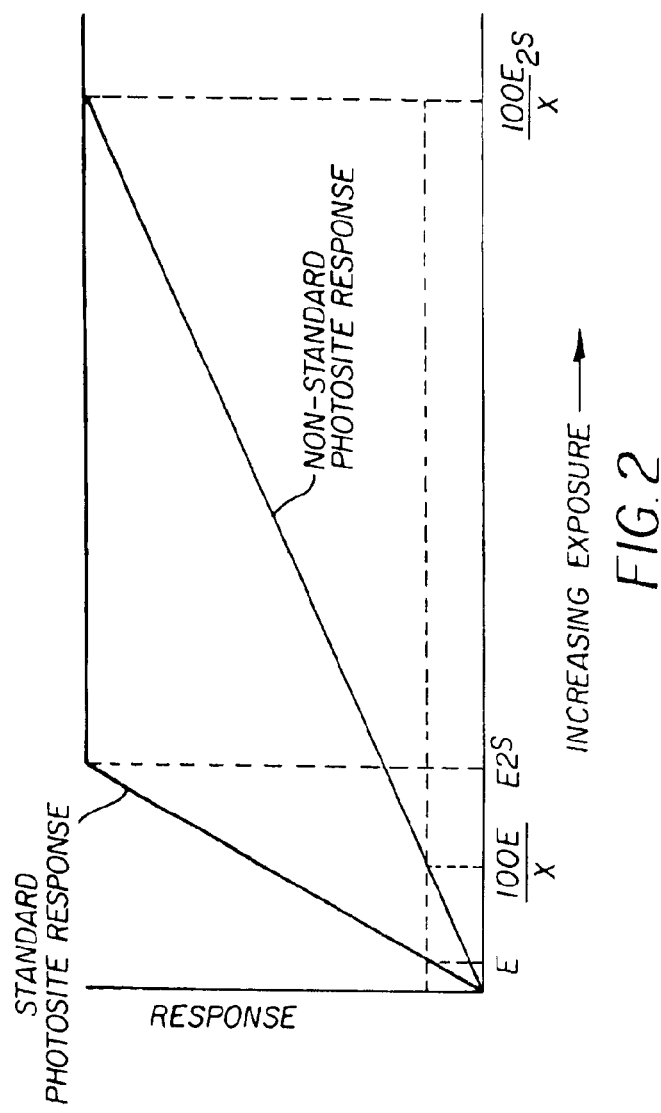
FIG. 2 is a graph illustrating the response of a standard photosite and a non-standard photosite.

In the preferred embodiment, the response of the selected non-standard photosites is X % (where X<=100) that of standard photosites for the same exposure, as shown graphically in FIG. 2. The selected photosites have a response that is slowed by two stops (−log X/100) relative to the standard photosites. In the preferred embodiment, X=25. In the preferred embodiment, when the system controller 18 is in "normal mode", all photosites have common gain equivalent to that of the standard response. Thus, the image sensing device 10 consists of multiple sets of photosites, the standard photosites and the non-standard photosites. The collection of the outputs of the standard photosites constitutes a sparsely sampled version of a scene. Likewise, the collection of the outputs of the non-standard photosites constitutes another sparsely sampled version of a scene.

Figure 7:
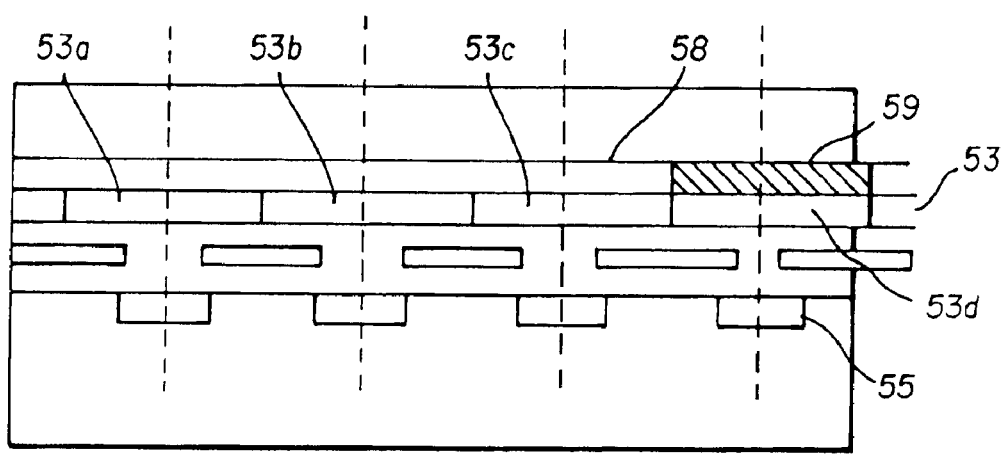
FIG. 7 is a cross-section of an image sensor employing an array of neutral density filters to alter the response of selected photosites.

As another alternative, the responses of the selected non-standard photosites can be slowed by the use of a neutral filter coating the photosite. FIG. 7 shows a cross section of an image sensing device with a color filter array 53. Note that the color filter array 53a is red, 53b is green, 53c is red, and 53d is green. A layer of neutral filters 58 is contained above the color filter array 53, although the position of the layer of neutral filters 58 and the color filter array 53 does not matter. Note that the layer of neutral filters 58 only contains a neutral filter at the positions of selected photosites, as indicated by the neutral filter 59. In this case, the layer of neutral filters 58 is transparent or nearly transparent for standard photosites and contains a neutral filter 59 for non-standard photosites. For example, if the neutral filter 59 consists of a material that allows X % transmission of light, then the response of that non-standard photosite will be slowed by $$-\log_2\left(\frac{X}{100}\right)$$

stops relative to the response of the standard photosite. If a neutral filter 59 is used to create non-standard photosites, then the system controller 18 is preferably set at the time of manufacture to be in "expanding mode."

The purpose of the DREFA processor 22 is to create a digital image signal with an increased dynamic range by processing the digital image signal while considering the standard and non-standard photosites. The operation of the DREFA processor 22 will be described in detail hereinbelow. Accordingly, the output of the DREFA processor 22 is an expanded image signal having increased dynamic range.

This expanded image signal is then input to the CFA interpolator for processing as previously described.

Figure 8:
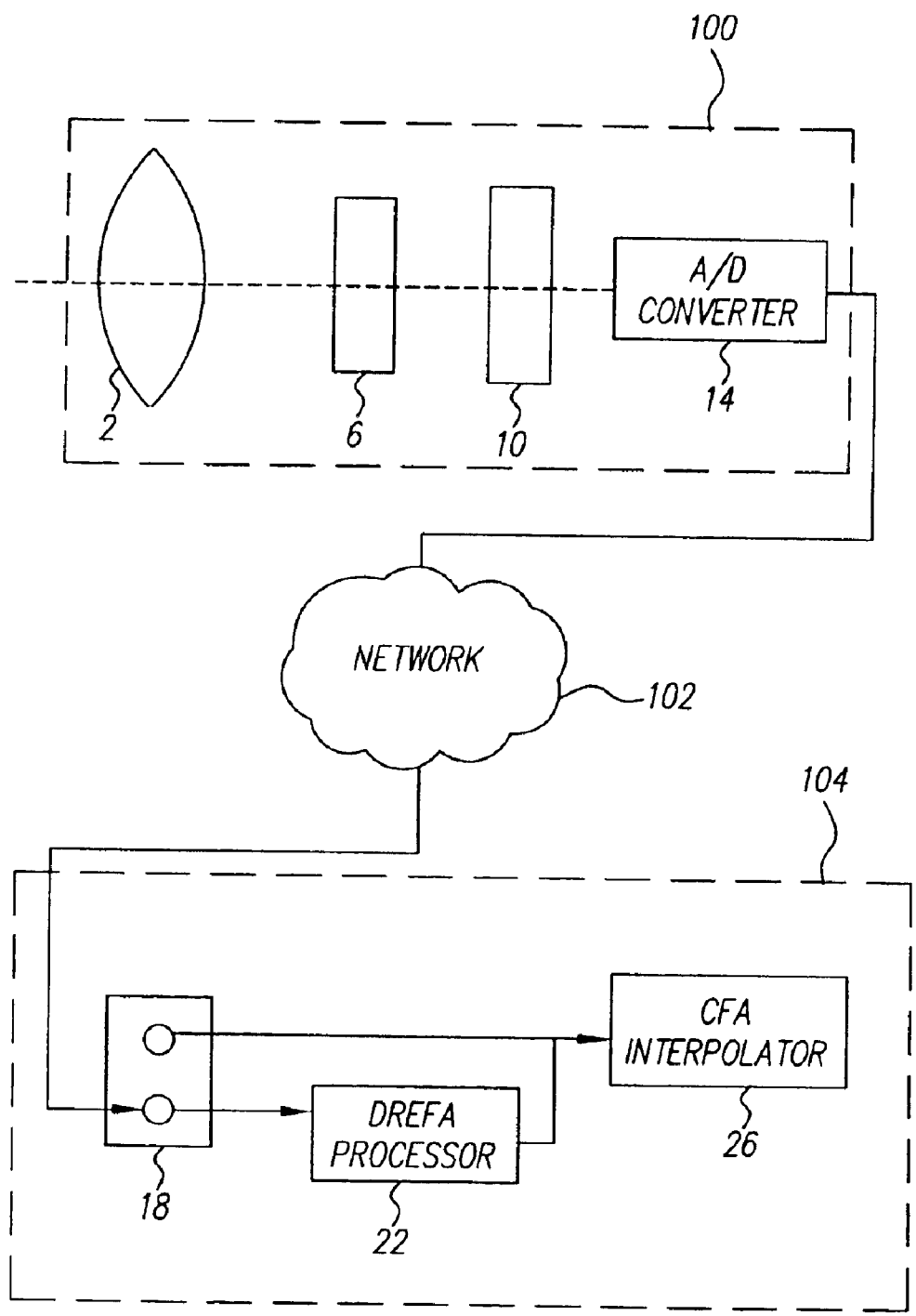
FIG. 8 is a block diagram of an embodiment of the image capture system.

Note that although FIG. 1 implies that the A/D converter 14 and the DREFA processor 22 are directly connected, this is not a requirement for the present invention. The DREFA processor 22 may reside in hardware or software in close proximity to the A/D converter 14 and image sensing device 10. For example, the DREFA processor 22 could reside directly within a digital camera. However, the DREFA processor 22 may also be remote from the image sensing device 10. For example, referring to FIG. 8, the image signal output from the A/D converter 14 can be transmitted (after compression) from the digital camera 100 to a host computer 104. Transmission can, optionally, be through a network 102. Likewise the image signal output from the A/D converter 14 can be transmitted (after compression) via a wire or wireless connection to a personal computing device, printer, or remote server (not shown) to apply to operation of the DREFA processor 22. Transmission of the image signal may also include file transfer protocol or email. Additionally, payment via credit card or some other means may be required by the DREFA processor 22 from the user.

In the preferred embodiment, 50% of the photosites of the image sensing device 10 are selected to have non-standard response. Those skilled in the art will recognize that varying the percentage of photosites which have non-standard response will still result in the advantages of the present invention. In the case of a image sensing device 10 in which all photosites have approximately equivalent spectral sensitivity (i.e. a pan-chromatic image sensing device), FIG. 3A shows an arrangement of the non-standard photosites that will result in approximately 50% of all the photosites of the image sensing device 10 being of non-standard response. The photosites 28 with non-standard response are marked with an asterisk (*), while the photosites 30 having standard response are blank.

In the case of a color image sensing device 10, FIG. 3B shows an arrangement wherein 50% of each type (red, green, or blue sensitive) of photosite has non-standard response. For example, the photosite 32 is a red photosite having non-standard response, the photosite 34 is a green photosite having non-standard response, the photosite 36 is a blue photosite having non-standard response, the photosite 38 is a red photosite having standard response, the photosite 40 is a green photosite having standard response, the photosite 42 is a blue photosite having standard response.

Note that FIGS. 3A and 3B imply a regular pattern for the location of the non-standard photosites. While it is preferable that the non-standard photosites are arranged in a regular pattern, it is by no means necessary. The non-standard photosites could be arranged randomly or semi-randomly over the surface of the image sensing device 10, and their location would be stored in some place accessible to the DREFA processor 22.

The response of a standard photosite to a certain exposure and the response of a non-standard photosite to the same exposure are shown in FIG. 2. Note that if a level of noise n is superimposed on the response, it can easily be seen that the standard photosite will yield a valid signal with lower exposures (beginning at exposure level E) than will the non-standard photosite (which yields valid signal beginning at $$\frac{100}{X}E.)$$

Alternatively, data from the non-standard photosite will be valid for higher exposure levels (up to signal level of $$\frac{100}{X}E2^S,$$

where S is the inherent dynamic range of a single photosite, typically S=5 stops) than would the standard photosite (which produces valid response up to an exposure of $E2^S$.) Note that both the standard photosite and the non-standard photosite have the same range of response in stops of exposure (S), but the response of the non-standard photosites is preferably $$-\log_2\left(\frac{X}{100}\right)$$

stops slower than the standard photosites, as shown in FIG. 2. It is preferred that the responses of the standard and non-standard photosites overlap with respect to exposure. That is, it is preferred that $$-\log_2\left(\frac{X}{100}\right) < S.$$

The overall dynamic range of the image sensing device, considering both standard and non-standard photosites, is $$S - \log_2\left(\frac{X}{100}\right).$$

In the case of the preferred embodiment, where S=5 and X=25, the overall effective dynamic range of the image sensing device 10 is 7 stops of exposure.

The processing of the DREFA processor 22 may be utilized to extend the overall dynamic range of the image sensing device 10 by using the non-standard photosite response to reconstruct the areas in the image where very high exposures occur. Likewise, the DREFA processor 22 also uses the photosites with standard response to reconstruct the signal where very low exposures occur.

FIG. 4 shows an exploded block diagram of the DREFA processor 22. The logarithmic image signal b(x,y) output from the A/D converter 14 is passed to the non-standard compensator 44. The purpose of the non-standard compensator 44 is to compensate the non-standard photosites by accounting for the offset in response by X stops. In the preferred embodiment, the image signal corresponding to the non-standard photosites are incremented by the quantity -cvs log (X/100), where cvs is the number of code values per stop of exposure. In the preferred embodiment, the quantity cvs is 51. Alternatively, if the image signal input to the non-standard compensator 44 is linearly related to exposure (rather than logarithmically), then the non-standard compensator 44 scales the image signal corresponding to the non-standard photosites by a factor of 100/X. Note that it is assumed that the locations of the non-standard photosites are known to the non-standard compensator 44. The output of the non-standard compensator 44 is an image signal i(x,y) that has been compensated at the locations of non-standard photosites for the difference between the non-standard photosite response in relation to the standard photosite response. At the locations of standard photosites, the value of the image signal b(x,y) output from the A/D converter 14 is identical to the value of the image signal i(x,y) output from the non-standard compensator 44. Note that the image signal i(x,y) is not limited to an 8 bit range. It the preferred embodiment, the value of i(x,y) ranges from 0 to 357.

Next, the image signal i(x,y) output from the non-standard compensator 44 is input to a non-standard thresholder 46. The purpose of the non-standard thresholder 46 is to determine problem locations of the non-standard image signal that are of low quality due to a photosite not receiving enough photons to produce a valid signal or due to a photosite receiving so many photons that the signal saturates. The image signal at these (x,y) locations is then replaced by calculating a new signal based upon nearby samples of the standard image signal in processing performed by the signal extender 50, which will be described in detail hereinbelow. All (x,y) locations of the non-standard signal for which the corresponding values of the non-standard signal are less than a predetermined threshold are considered to be problem locations. In the case of the non-standard photosite, this predetermined threshold used for the purpose of detecting problem locations is referred to as the low exposure response threshold. Thus, a location (x,y) is considered to be a problem location if it is a non-standard photosite and if:

$$i(x,y) < T_1$$

where $T_1$ is predetermined. In the preferred embodiment, the value of $$T_1 \text{ is } -cvs \log_2\left(\frac{X}{100}\right),$$

which in the preferred embodiment is 102. Note that the threshold $T_1$ may be dependent upon the color of the photosite at location (x,y). Non-standard photosites that are problem locations are referred to as noise pixels, since the value of i(x,y) is not sufficiently about the noise level of the image sensing device to be useful.

Likewise, the image signal i(x,y) output from the non-standard compensator 44 is input to a standard thresholder 48. The purpose of a standard thresholder 48 is to determine problem locations of the standard image signal that are of low quality. The image signal at these locations is then replaced by calculating a new signal based upon nearby samples of the non-standard image signal in processing performed by the signal extender 50, which will be described in detail hereinbelow. All (x,y) locations of the standard image signal for which the corresponding values of the standard signal are less than a predetermined threshold signal are considered to be problem locations. In the case of the standard photosite, this predetermined threshold used for the purpose of detecting problem locations is referred to as the high exposure response threshold. Thus, a location (x,y) is considered to be a problem location if it is a standard photosite and if:

$$i(x,y) > T_2$$

where $T_2$ is predetermined. In the preferred embodiment, the value of $T_2$ is 254. Note that the threshold $T_2$ may be dependent upon the color of the photosite at location (x,y). Standard photosites that are problem locations are referred to as saturated pixels, since the value of i(x,y) is as high as possible at these locations.

The problem locations determined by the non-standard thresholder 46 and the problem locations determined by the standard thresholder 48 are input to the signal extender 50. In addition, the image signal i(x,y) output from the non-standard compensator 44 is also input to the signal extender 50. The purpose of the signal extender 50 is to replace the image signal i(x,y) values at problem locations (x,y) with estimates of the signal herein referred to as replacement values, had the inherent dynamic range of each photosite of the image sensing device 10 been greater. If the problem location is coincident with a non-standard photosite, then the replacement value is calculated from neighboring image signal values coincident with standard photosites. In this embodiment, the term "neighboring" refers to a certain spatial distance. In the preferred embodiment, the photosites neighboring a selected photosites are those photosites within a distance of 2 photosites of the selected photosite. Likewise, if the problem location is coincident with a standard photosite, then the replacement value is calculated from neighboring image signal values coincident with non-standard photosites. In the preferred embodiment, the color of the photosite at the problem photosite is also taken into account. The replacement value for any problem location is preferably determined only by the signal originating from neighboring photosites of the same color. The output of the signal extender 50 is an image signal i'(x,y) having a dynamic range as if captured by an image sensing device 10 having photosites with inherent dynamic range of $$S - \log_2\left(\frac{X}{100}\right)$$

rather than the actual inherent dynamic range of S for each photosite of the image sensing device 10. Note that for all (x,y) locations that are not problem locations, the value of i'(x,y) is equivalent to i(x,y).

As an example of the processing performed by the signal extender 50 for the Bayer CFA pattern shown in FIG. 3B, if location (x,y) is a problem location and (x,y) is the location of a green photosite (such as photosite 34 in FIG. 3B), then the replacement value i'(x,y) for the image signal i(x,y) is calculated in the following manner:

$$i'(x,y) = 0.25 * [i(x-1,y-1) + i(x+1,y-1) + i(x-1,y+1) + i(x+1,y+1)]$$

Note that signal values that the calculation of i'(x,y) is dependent upon are expected to comply with certain requirements. For example, suppose that (x,y) is a problem location and (x,y) is a green photosite with non-standard response. Then the signal levels of neighboring photosites are used to calculate replacement value i'(x,y). However, this assumes that the signal values of each of the neighboring photosites are also less than $T_3$. In the preferred embodiment, $T_3 = T_1$. For each neighboring photosite that this is not the case, that signal level is omitted from the calculation of the replacement value i'(x,y). For example, if i(x-1, y-1) > $T_3$, then the value i'(x,y) is calculated with the following formula:

$$i'(x,y) = \frac{1}{3} * [i(x+1,y-1) + i(x-1,y+1) + i(x+1,y+1)]$$

Generally, the interpolation scheme for determining a replacement value at problem location (x,y), where the location (x,y) corresponds to a green photosite which is also a standard photosite on a image sensing device having a Bayer pattern filter array is given with the following equation:

$$i'(x, y) = \frac{\sum_{j=-1,1}\sum_{k=-1,1} i(x+j, y+k)W(x+j, y+k)}{\sum_{j=-1,1}\sum_{k=-1,1} W(x+j, y+k)}$$

where $$W(x+j, y+k) = \begin{cases} 1 & i(x+j, y+k) > T_3 \\ 0 & \text{otherwise} \end{cases}$$

Note that the same equation is applied to determine the replacement value if the problem location corresponds with a green photosite which is also a non-standard photosite. However, in this case $$W(x+j, y+k) = \begin{cases} 1 & i(x+j, y+k) > T_4 \\ 0 & \text{otherwise} \end{cases},$$

where in the preferred embodiment, $T_4=T_2$.

As another example, also in connection with the Bayer CFA pattern shown in FIG. 3B, if location i(x,y) is a problem photosite and (x,y) is the location of a red or blue photosite, then the replacement value i'(x,y) for the image signal i(x,y) is calculated in the following manner:

$$i'(x,y)=0.25*[i(x-2,y)+i(x+2,y)+i(x,y+2)+i(x,y-2)]$$

When location (x,y) is a red or blue photosite and is also a standard photosite, the equation for determining the replacement value i'(x,y) may be generalized as follows:

$$i'(x, y) = \frac{\sum_{j=-2,0,2}\sum_{k=-2,0,2} i(x+j, y+k)W(x+j, y+k)}{\sum_{j=-2,0,2}\sum_{k=-2,0,2} W(x+j, y+k)}$$

where $$W(x+j, y+k) = \begin{cases} 1 & i(x+j, y+k) > T_3 \\ 0 & \text{otherwise} \end{cases}$$

Note that in this case, either j or k must be 0, but j and k are never both zero. Note also that the same equation is applied to determine the replacement value if the problem location corresponds with a red or blue photosite which is also a non-standard photosite. However, in this case $$W(x+j, y+k) = \begin{cases} 1 & i(x+j, y+k) < T_4 \\ 0 & \text{otherwise} \end{cases},$$

where in the preferred embodiment, $T_4=T_2$.

The interpolation scheme described above for the purpose of generating an image signal with an extended dynamic range from more than one sparsely sampled image signals may be modified by those skilled in the art. However, many such modifications to the above interpolation scheme may be derived and should not be considered as significant deviations of the present invention.

Those skilled in the art will recognize that the above interpolation scheme performed by the signal extender is a lowpass filter, which is well known in the art. Typically, the application of a lowpass filter to a digital image signal has a similar effect to reducing the resolution of the digital image signal. Thus, the processing performed by the DREFA processor 22 is a method by which the spatial resolution of the image sensing device 10 may be traded for dynamic range of the image sensing device 10. Indeed, those areas of an image where the interpolation scheme is implemented to increase the dynamic range of the signal appear noticeably softer (less sharp) than the image would have if that same area of the image had been captured by the sensor in such a fashion that no "problem locations" (as defined by the non-standard thresholder 46 and the standard thresholder 48) occur.

The invention has been described in detail with particular reference to certain preferred embodiments thereof, but it will be understood that variations and modifications can be effected within the spirit and scope of the invention. For example, the invention provides an image capture system that expands the dynamic range in both directions, i.e., that expands the response of the standard photosites to increased exposures by utilizing the image signals from neighboring non-standard photosites and expands the response of the non-standard photosites to decreased exposures by utilizing the image signals from neighboring standard photosites. It would be likewise feasible for the system to work on dynamic range from only one direction, i.e., to expand the response of only the standard photosites to increased light exposures by utilizing the image signals from neighboring non-standard photosites, or alternatively, to expand the response of only the non-standard photosites to decreased light exposures by utilizing the image signals from neighboring standard photosites.

PARTS LIST 2 lens
6 optical lowpass filter
10 image sensing device
14 A/D converter
18 system controller
22 DREFA processor
26 CFA interpolator
28 non-standard photosite
30 standard photosite
32 red non-standard photosite
34 green non-standard photosite
36 blue non-standard photosite
38 red standard photosite
40 green standard photosite
42 blue standard photosite
44 non-standard compensator
46 non-standard thresholder
48 standard thresholder
50 signal extender
51 standard lenslet
52 non-standard lenslet
53 color filter array
54 metallic mask portion
55 photosensitive area
56 large aperture
57 small aperture
58 neutral density filter layer
59 non-standard neutral density filter

What is claimed is:

1. An image capture system for generating an extended effective dynamic range from a signal provided by an image sensor, said image capture system comprising:
    an image sensing device having standard photosites with a predetermined response to a light exposure and non-standard photosites with a slower response to the same light exposure, said image sensing device having a color filter array of at least three different colors overlying said photosites, said standard and non-standard photosites each being associated with each of said colors;
an optical section exposing the image sensing device to image light, thereby causing the image sensing device to generate an image signal;
an additional section receiving said image signal;
a processing section expanding the response of the standard photosites to increased light exposures by utilizing signals from neighboring non-standard photosites of the same color; and
a controller having a normal mode and an expanding mode, said controller in said normal mode diverting said signal directly to said additional section, said controller in said expanding mode diverting said image signal through said processing section to said additional section.

2. The image capture system as claimed in claim 1 wherein the processing section expands the response of the non-standard photosites to decreased light exposures by utilizing the image signals from neighboring standard photosites.

3. The image capture system as claimed in claim 1 wherein the non-standard photosites have a response that is slower by at least one stop compared to the standard photosites.

4. The image capture system as claimed in claim 1, wherein the photosites are arranged in such a manner that the nearest photosite with the same color to a given photosite does not have the same response as the given photosite.

5. The image capture system as claimed in claim 1, wherein the photosites are color photosites and are arranged such that the four photosites constituting the nearest neighbors of a given non-standard photosite comprise two standard photosites and two nonstandard photosites.

6. The image capture system as claimed in claim 1 wherein said additional section is a color filter array interpolator.

7. The image capture system as claimed in claim 1 wherein said controller is disposable in each of said modes responsive to user input.

8. The image capture system as claimed in claim 1 wherein said controller is permanently set in said expanding mode.

9. An image capture system for generating an extended effective dynamic range from a signal provided by an image sensor, said image capture system comprising:
an image sensing device having standard photosites with a predetermined response to a light exposure and non-standard photosites with a slower response to the same light exposure;
an optical section for exposing the image sensing device to image light, thereby causing the image sensing device to generate an image signal; and
a processing section for expanding the response of the standard photosites to increased light exposures by utilizing the image signals from neighboring non-standard photosites;
wherein the processing section expands the response of the non-standard photosites to decreased light exposures by utilizing the image signals from neighboring standard photosites; and
wherein the processing section further comprises:
means for processing the image signals against a plurality of thresholds, including a high exposure response threshold for the standard photosites and a low exposure response threshold for the non-standard photosites;
means for replacing the image signals from standard photosites exceeding the high exposure response threshold with a combination of the image signals from a neighborhood of non-standard photosites; and
means for replacing the image signals from non-standard photosites less than the low exposure response threshold with a combination of the image signals from a neighborhood of standard photosites, thereby producing an output image signal with an extended effective dynamic range.

10. The image capture system as claimed in claim 9 wherein the image sensing device and the optical section are part of a digital camera and the processing section is part of a host computer separate from the digital camera.

11. The image capture system as claimed in claim 10 wherein the processor is accessible via a network.

12. The image capture system as claimed in claim 9 wherein the image sensing device, the optical section and the processing section are included in a digital camera.

13. The image capture system as claimed in claim 9, wherein the photosites are arranged in such a manner such that the nearest photosite to a given photosite does not have the same response as the given photosite.

14. An image capture system for generating an extended effective dynamic range from a signal provided by an image sensor, said image capture system comprising:
an image sensing device having standard photosites with a predetermined response to a light exposure and non-standard photosites with a slower response to the same light exposure;
a color filter array comprised of two or more colors overlying the photosites, said standard and non-standard photosites being associated with each color of the array;
an optical section exposing the image sensing device to image light, thereby causing the image sensing device to generate an image signal; and
a processing section expanding the response of the standard photosites of each color to increased light exposures by utilizing the image signals from neighboring non-standard photosites of the same color at least two lines removed from the corresponding standard photosite and expanding the response of the non-standard photosites of each color to decreased light exposures by utilizing the image signals from neighboring standard photosites of the same color at least two lines removed from the corresponding non-standard photosite.

15. An image capture system providing an extended effective dynamic range, said system comprising:
an image sensing device having standard photosites with a predetermined standard response to a light exposure and non-standard photosites with a slower response to the same light exposure;
an optical section for exposing the image sensing device to image light, thereby causing the image sensing device to generate an image signal;
means for converting the image signal into digital image signals corresponding to the output of the standard and non-standard photosites; and
a processor that (a) processes the digital image signals against a plurality of thresholds, including a high exposure response threshold for the standard photosites and a low exposure response threshold for the non-standard photosites, (b) replaces the digital image signals from standard photosites exceeding the high exposure response threshold with a combination of the digital image signals from a neighborhood of non-standard photosites and (c) replaces the digital image signals from non-standard photosites less than the low exposure response threshold with a combination of the digital image signals from a neighborhood of standard photosites, thereby producing an output digital image signal with an extended effective dynamic range.

16. The image capture system as claimed in claim 15 wherein the non-standard photosites have a response that is slower by at least one stop compared to the standard photosites.

17. The image capture system as claimed in claim 15 wherein the photosites are monochromatic photosites.

18. The image capture system as claimed in claim 15 wherein the photosites are color photosites.

19. The image capture system as claimed in claim 18 wherein the color photosites are arranged in a color filter array pattern.

20. The image capture system as claimed in claim 19 wherein each photosite is sensitive to one of a plurality of colors and the processor interpolates the other colors for each photosite from the neighboring photosites.

21. The image capture system as claimed in claim 15 wherein the image sensing device, the optical section and the converting means are part of a digital camera and the processor is part of a host computer separate from the digital camera.

22. The image capture system as claimed in claim 21 wherein the processor is accessible via a network.

23. The image capture system as claimed in claim 15 wherein the image sensing device, the optical section, the converting means and the processor are included in a digital camera.

24. An image capture device providing an extended effective dynamic range, said image capture device comprising:
an image sensing device having standard photosites with a predetermined standard response to a light exposure and non-standard photosites with a slower response to the same light exposure;
an optical section for exposing the image sensing device to image light, thereby causing the image sensing device to generate an image signal;
means for converting the image signal into digital image signals corresponding to the output of the standard and non-standard photosites; and
a processor that expands the response of the standard photosites to increased exposures by utilizing the digital image signals from neighboring non-standard photosites and expands the response of the non-standard photosites to decreased exposures by utilizing the digital image signals from neighboring standard photosites;
wherein the processor (a) processes the digital image signals against a plurality of thresholds, including a high exposure response threshold for the standard photosites and a low exposure response threshold for the non-standard photosites, (b) replaces the digital image signals from standard photosites exceeding the high exposure response threshold with a combination of the digital image signals from a neighborhood of non-standard photosites and (c) replaces the digital image signals from non-standard photosites less than the low exposure response threshold with a combination of the digital image signals from a neighborhood of standard photosites, thereby producing an output digital image signal with an extended effective dynamic range.

25. A method for generating an extended effective dynamic range from a signal provided by an image sensor, said method comprising the steps of:
generating image signals from an image sensing device having standard photosites with a predetermined standard response to a light exposure and non-standard photosites with a slower response to the same light exposure, said image sensing device having a color filter array of at least three different colors overlying said photosites, said standard and non-standard photosites being associated with each of said colors;
setting one of an expanding mode and a normal mode;
in said expanding mode, expanding the dynamic range of selected photosites to extreme exposures by utilizing the image signals from neighboring photosites having a response, either standard or non-standard, opposite to that of the selected photosites; and
in said normal mode, transmitting said image signals without said expanding.

26. The method as claimed in claim 25 wherein said expanding the dynamic range comprises expanding the response of the standard photosites to increased exposures by utilizing the image signals from neighboring non-standard photosites and expanding the response of the non-standard photosites to decreased exposures by utilizing the image signals from neighboring standard photosites.

27. A method for generating an extended effective dynamic range from a signal provided by an image sensor, said method comprising the steps of:
generating image signals from an image sensing device having standard photosites with a predetermined standard response to a light exposure and non-standard photosites with a slower response to the same light exposure; and
expanding the dynamic range of selected photosites to extreme exposures by utilizing the image signals from neighboring photosites having a response, either standard or non-standard, opposite to that of the selected photosites;
wherein the step of expanding the dynamic range comprises expanding the response of the standard photosites to increased exposures by utilizing the image signals from neighboring non-standard photosites and expanding the response of the non-standard photosites to decreased exposures by utilizing the image signals from neighboring standard photosites; and
wherein the step of expanding the respective response of the standard and non-standard photosites comprises the steps of:
processing the image signals against a plurality of thresholds, including a high exposure response threshold for the standard photosites and a low exposure response threshold for the non-standard photosites;
replacing the image signals from standard photosites exceeding the high exposure response threshold with a combination of the image signals from a neighborhood of non-standard photosites; and
replacing the image signals from non-standard photosites less than the low exposure response threshold with a combination of the image signals from a neighborhood of standard photosites, thereby producing an output image signal with an extended effective dynamic range.

28. The method as claimed in claim 27 wherein said setting is responsive to user input.

29. An image sensor for generating an image signal with a differential response to image light, said image sensor comprising:
   an array of photosites divided into standard photosites and non-standard photosites; and
   a structural element overlying the photosites and providing the standard photosites with a predetermined standard response to a light exposure and the non-standard photosites with a slower response to the same light exposure;
   wherein the photosites are arranged such that the four photosites constituting the nearest neighbors of a given non-standard photosite comprise four standard photosites and the four photosites constituting the nearest neighbors of a given standard photosite comprise four nonstandard photosites.

30. The image sensor as claimed in claim 29 wherein the photosites are monochromatic photosites.

31. The image sensor as claimed in claim 29 wherein the structural element comprises an array of lenslets overlying the photosites, wherein the lenslets overlying the standard photosites are structured to be more efficient in focusing light than the lenslets overlying the non-standard photosites.

32. The image sensor as claimed in claim 29 wherein the structural element comprises a mask with apertures overlying the photosites, wherein the apertures overlying the standard photosites are larger than the apertures overlying the non-standard photosites.

33. The image sensor as claimed in claim 29 wherein the structural element comprises a neutral density filter overlying the photosites, wherein the portion of the neutral density filter overlying the standard photosites is more transparent than the portion of the neutral density filter overlying the non-standard photosites.

34. An algorithm utilizing the image sensor as claimed in claim 29 in order to expand the response of the standard photosites to increased exposures by utilizing the image signals from neighboring non-standard photosites and to expand the response of the non-standard photosites to decreased exposures by utilizing the image signals from neighboring standard photosites.

35. The image sensor as claimed in claim 29 further including a color filter array comprised of two or more colors overlying the photosites, said standard and non-standard photosites being associated with each color of the array.

36. The image sensor as claimed in claim 35 wherein the color filter array is a Bayer array.

37. A digital camera including the image sensor claimed in claim 29.

38. The image sensor as claimed in claim 29 wherein the structural element comprises an array of lenslets overlying the standard photosites, and the non-standard photosites are not overlayed with lenslets.

39. An algorithm utilizing an image sensor for generating an image signal with a differential response to image light, said image sensor comprising:
   an array of photosites divided into standard photosites and non-standard photosites;
   a structural element overlying the photosites and providing the standard photosites with a predetermined standard response to a light exposure and the non-standard photosites with a slower response to the same light exposure; and
   a color filter array comprised of two or more colors overlying the photosites, said standard and non-standard photosites being associated with each color of the array;
   in order to expand the response of the standard photosites of each color to increased exposures by utilizing the image signals from neighboring non-standard photosites of the same color at least two lines removed from the corresponding standard photosite and to expand the response of the non-standard photosites of each color to decreased exposures by utilizing the image signals from neighboring standard photosites of the same color at least two lines removed from the corresponding non-standard photosite.

40. An image capture system providing an extended effective dynamic range, said system comprising:
   an image sensing device having standard photosites with a predetermined standard response to a light exposure and non-standard photosites with a slower response to the same light exposure;
   an optical section for exposing the image sensing device to image light, thereby causing the image sensing device to generate an image signal;
   means for converting the image signal into digital image signals corresponding to the output of the standard and non-standard photosites; and
   a processor that (a) processes the digital image signals against a plurality of thresholds, including a first high exposure response threshold for the standard photosites and a second low exposure response threshold for the non-standard photosites, (b) replaces the digital image signals from standard photosites exceeding the first high exposure response threshold with a combination of the digital image signals from a neighborhood of non-standard photosites which exceed a third threshold and (c) replaces the digital image signals from non-standard photosites less than the second low exposure response threshold with a combination of the digital image signals from a neighborhood of standard photosites which exceed a fourth threshold, thereby producing an output digital image signal with an extended effective dynamic range.

41. The image capture system as claimed in claim 40 wherein the third threshold is equivalent to the high exposure response threshold.

42. The image capture system as claimed in claim 40 wherein the fourth threshold is equivalent to the low exposure response threshold.

43. An image capture system for generating an extended effective dynamic range from a signal provided by an image sensor, said image capture system comprising:
   an image sensing device having standard photosites with a predetermined response to a light exposure and non-standard photosites with a slower response to the same light exposure;
   an optical section exposing the image sensing device to image light, thereby causing the image sensing device to generate an image signal; and
   a processing section expanding the response of the standard photosites to increased light exposures by utilizing the image signals from neighboring non-standard photosites;
   wherein the photosites are color photosites and are arranged such that the four photosites constituting the nearest neighbors of a given non-standard photosite comprise two standard photosites and two nonstandard photosites and the four photosites constituting the nearest neighbors of a given standard photosite comprise two standard photosites and two nonstandard photosites.

44. An image capture system for generating an extended effective dynamic range from a signal provided by an image sensor, said image capture system comprising:

an image sensing device having standard photosites with a predetermined response to a light exposure and non-standard photosites with a slower response to the same light exposure;

an optical section for exposing the image sensing device to image light, thereby causing the image sensing device to generate an image signal; and a processing section for expanding the response of the standard photosites to increased light exposures by utilizing the image signals from neighboring non-standard photosites;

wherein the photosites are color photosites and are arranged such that the four photosites constituting the nearest neighbors of a given non-standard photosite comprise two standard photosites and two nonstandard photosite and the four photosites constituting the nearest neighbors of a given standard photosite comprise two standard photosites and two nonstandard photosites; and wherein the photosites are color photosites and are arranged such that the eight photosites constituting the nearest neighbors of a given standard photosite which is green in color comprise four non-standard photosites which are green in color, one standard photosite which is red in color, one standard photosite which is blue in color, one non-standard photosite which is red in color, and one non-standard photosite which is blue in color.

45. An image capture system for generating an extended effective dynamic range from a signal provided by an image sensor, said image capture system comprising:

an image sensing device having standard photosites with a predetermined response to a light exposure and non-standard photosites with a slower response to the same light exposure;

an optical section for exposing the image sensing device to image light, thereby causing the image sensing device to generate an image signal; and a processing section for expanding the response of the standard photosites to increased light exposures by utilizing the image signals from neighboring non-standard photosites;

wherein the photosites are color photosites and are arranged such that the four photosites constituting the nearest neighbors of a given non-standard photosite comprise two standard photosites and two nonstandard photosite and the four photosites constituting the nearest neighbors of a given standard photosite comprise two standard photosites and two nonstandard photosites; and wherein the photosites are color photosites and are arranged such that the eight photosites constituting the nearest neighbors of a given non-standard photosite which is green in color comprise four standard photosites which are green in color, one standard photosite which is red in color, one standard photosite which is blue in color, one non-standard photosite which is red in color, and one non-standard photosite which is blue in color.

46. An image capture system for generating an extended effective dynamic range from a signal provided by an image sensor, said image capture system comprising:

an image sensing device having standard photosites with a predetermined response to a light exposure and non-standard photosites with a slower response to the same light exposure;

an optical section for exposing the image sensing device to image light, thereby causing the image sensing device to generate an image signal; and a processing section for expanding the response of the standard photosites to increased light exposures by utilizing the image signals from neighboring non-standard photosites;

wherein the photosites are color photosites and are arranged such that the four photosites constituting the nearest neighbors of a given non-standard photosite comprise two standard photosites and two nonstandard photosite and the four photosites constituting the nearest neighbors of a given standard photosite comprise two standard photosites and two nonstandard photosites; and wherein the photosites are color photosites and are arranged such that the eight photosites constituting the nearest neighbors of a given photosite which is red in color comprise two non-standard photosites which are green in color, two standard photosite which are green in color, two standard photosites which are blue in color, and two non-standard photosites which are blue in color.

47. An image capture system for generating an extended effective dynamic range from a signal provided by an image sensor, said image capture system comprising:

an image sensing device having standard photosites with a predetermined response to a light exposure and non-standard photosites with a slower response to the same light exposure;

an optical section for exposing the image sensing device to image light, thereby causing the image sensing device to generate an image signal; and a processing section for expanding the response of the standard photosites to increased light exposures by utilizing the image signals from neighboring non-standard photosites;

wherein the photosites are color photosites and are arranged such that the four photosites constituting the nearest neighbors of a given non-standard photosite comprise two standard photosites and two nonstandard photosite and the four photosites constituting the nearest neighbors of a given standard photosite comprise two standard photosites and two nonstandard photosites; and wherein the photosites are color photosites and are arranged such that the eight photosites constituting the nearest neighbors of a given photosite which is blue in color comprise two non-standard photosites which are green in color, two standard photosite which are green in color, two standard photosites which are red in color, and two non-standard photosites which are red in color.

48. An image capture system for generating an extended effective dynamic range from a signal provided by an image sensor, said image capture system comprising:

an image sensing device having standard photosites with a predetermined response to a light exposure and non-standard photosites with a slower response to the same light exposure;

an optical section exposing the image sensing device to image light, thereby causing the image sensing device to generate an image signal; and a processing section expanding the response of the standard photosites to increased light exposures by utilizing the image signals from neighboring non-standard photosites;

wherein the photosites are arranged such that the four photosites constituting the nearest neighbors of a given non-standard photosite comprise four standard photosites and the four photosites constituting the nearest neighbors of a given standard photosite comprise four nonstandard photosites.

49. An image capture system for generating an extended effective dynamic range from a signal provided by an image sensor, said image capture system comprising:

an image sensing device having standard photosites with a predetermined response to a light exposure and non-standard photosites with a slower response to the same light exposure;

an optical section exposing the image sensing device to image light, thereby causing the image sensing device to generate an image signal;

an additional section receiving said image signal;

a processing section expanding the response of the standard photosites to increased light exposures by utilizing signals from neighboring non-standard photosites; and a controller having a normal mode and an expanding mode, said controller in said normal mode diverting said signal directly to said additional section, said controller in said expanding mode diverting said image signal through said processing section to said additional section;

wherein said controller is disposable in each of said modes as a function of dynamic range of said image signal.

50. A method for generating an extended effective dynamic range from a signal provided by an image sensor, said method comprising the steps of:

generating image signals from an image sensing device having standard photosites with a predetermined standard response to a light exposure and non-standard photosites with a slower response to the same light exposure;

setting one of an expanding mode and a normal mode;

in said expanding mode, expanding the dynamic range of selected photosites to extreme exposures by utilizing the image signals from neighboring photosites having a response, either standard or non-standard, opposite to that of the selected photosites; and in said normal mode, transmitting said image signals without said expanding;

wherein said setting is a function of dynamic range of said image signals.

51. An image capture system for generating an extended effective dynamic range from a signal provided by an image sensor, said image capture system comprising:

an image sensing device having standard photosites with a predetermined response to a light exposure and non-standard photosites with a slower response to the same light exposure;

an optical section exposing the image sensing device to image light, thereby causing the image sensing device to generate an image signal;

a Bayer color filter array overlying the photosites, said standard and non-standard photosites being associated with each color of the array, and a processing section expanding the response of the standard photosites to increased light exposures by utilizing the image signals from neighboring non-standard photosites;

wherein the photosites are arranged such that the eight photosites constituting the nearest neighbors of a given photosite which is red in color comprise two non-standard photosites which are green in color, two standard photosite which are green in color, two standard photosites which are blue in color, and two non-standard photosites which are blue in color.

52. An image capture system for generating an extended effective dynamic range from a signal provided by an image sensor, said image capture system comprising:

an image sensing device having standard photosites with a predetermined response to a light exposure and non-standard photosites with a slower response to the same light exposure;

an optical section exposing the image sensing device to image light, thereby causing the image sensing device to generate an image signal;

a Bayer color filter array overlying the photosites, said standard and non-standard photosites being associated with each color of the array; and a processing section expanding the response of the standard photosites to increased light exposures by utilizing the image signals from neighboring non-standard photosites;

wherein the photosites are arranged such that the eight photosites constituting the nearest neighbors of a given photosite which is blue in color comprise two non-standard photosites which are green in color, two standard photosite which are green in color, two standard photosites which are red in color, and two non-standard photosites which are red in color.

53. An image capture system for generating an extended effective dynamic range from a signal provided by an image sensor, said image capture system comprising:

an image sensing device having a uniform two-dimensional array of photosites, including standard photosites with a predetermined response to a light exposure and non-standard photosites with a slower response to the same light exposure, said image sensing device having a color filter array of at least three different colors overlying said photosites, said standard and non-standard photosites being associated with each of said colors;

an optical section exposing the image sensing device to image light, thereby causing the image sensing device to generate an image signal; and a processing section having expanding and normal modes, said processing section in said expanding mode expanding the response of the standard photosites to increased light exposures by utilizing the image signals from neighboring non-standard photosites and expanding the response of the non-standard photosites to decreased light exposures by utilizing the image signals from neighboring standard photosites, said responses being free of said expanding in said normal mode.

54. The image capture system as claimed in claim 53 wherein the photosites are color photosites and the neighboring non-standard photosites are of the same color as standard photosite being processed by the processing section.

* * * * *